United States Patent [19]

Baur

[11] Patent Number: 4,697,966
[45] Date of Patent: Oct. 6, 1987

[54] PRESSURIZED CLAMP FOR SECURING TOOLS OR WORKPIECES

[75] Inventor: Manfred Baur, Ulm-Jungingen, Fed. Rep. of Germany

[73] Assignee: Albert Schrem Werkzeugfabrik GmbH, Giengen, Fed. Rep. of Germany

[21] Appl. No.: 745,314

[22] Filed: Jun. 14, 1985

[30] Foreign Application Priority Data

Jun. 14, 1984 [DE] Fed. Rep. of Germany ....... 3422000

[51] Int. Cl.$^4$ .............................................. B23F 23/12
[52] U.S. Cl. ................... 409/232; 279/1 G; 279/4; 409/60
[58] Field of Search ............ 279/1 G, 2 A, 4; 409/33, 60, 232, 234

[56] References Cited

U.S. PATENT DOCUMENTS 2,911,222 11/1959 Eve ........................................... 279/4
3,242,818 3/1966 Kastler .................................. 409/234

FOREIGN PATENT DOCUMENTS 2351744 12/1977 France ................................. 409/232
1377365 12/1974 United Kingdom ............... 279/2 A
2074056 10/1981 United Kingdom .................... 279/4

Primary Examiner—Gil Weidenfeld
Assistant Examiner—Daniel W. Howell
Attorney, Agent, or Firm—Becker & Becker, Inc.

[57] ABSTRACT

A pressurized or hydraulic clamp, with piston reset, for securing tools or workpieces, such as grinding wheels, milling tools, and the like, to a shaft. By pressurizing with a hydraulic fluid, a floating piston is pressed out of the clamping unit to hold the workpieces or tools against a support. In order to retract the piston when the hydraulic pressure is released, the circular piston is provided with a bead on its outside or inside, depending upon the application; the bead is connected to one or more springs. The springs, which are pre-tensioned in the starting position, and are further tensioned when the piston is driven out, automatically reset the piston when the pressure is released.

6 Claims, 14 Drawing Figures

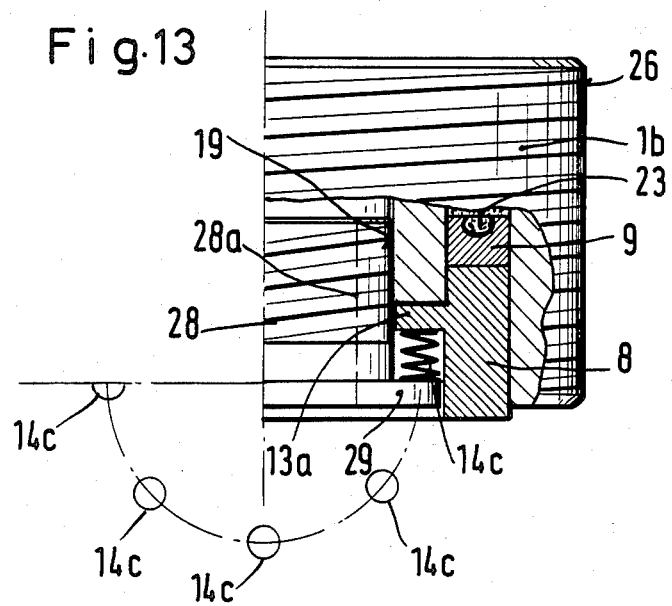
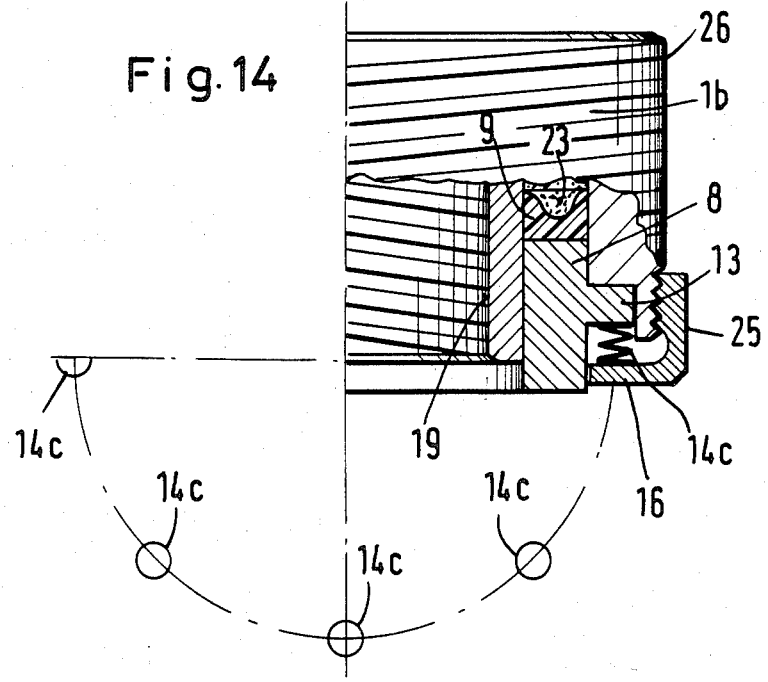

4,697,966

PRESSURIZED CLAMP FOR SECURING TOOLS OR WORKPIECES

BACKGROUND OF THE INVENTION

1. Field of the Invention

The present invention relates to a pressurized clamp or chuck for clamping or securing tools or workpieces, and in particular for axially securing tools or workpieces mounted on a shaft, for example grinding wheels, milling tools, or the like; the clamp has a floating circular piston which is mounted at the front of the device and is adjustable axially by means of a pressurized fluid.

2. Description of the Prior Art

Existing clamps of this type are used to secure the workpiece or tool, for example between a stop and a nut bolted to the end of a shaft The circular device is thereby located between the workpiece or the tool, and the nut. In some designs, the clamp is provided with a female or inside thread so that it can be screwed directly onto the relevant shaft end. There are also other types in which the clamp is fitted with an external or male thread, for example for screwing into a hollow cylinder.

The clamping process is effected by pressing the floating piston axially against the workpiece, since it can move along the axis of the shaft. Thus, for example, the piston can be connected hydrostatically to one or more tangentially or axially arranged adjustment pistons via channels inside the clamp. When the adjustment piston is pressed in, the main piston is pressed out beyond the fixed front surface of the device, whereby the necessary power is transmitted due to the fact that the active area of the adjustment piston is much smaller than that of the main piston. An externally accessible screw is provided for pushing in the adjustment piston; this screw is located axially or coaxially to the adjustment piston. For securing or clamping, the device is screwed onto the shaft end by hand until it is pressed against the workpiece or tool. The securing screws of the adjustment piston are then screwed in with a tool, for example a key, until the pressure produced by the adJustment pistons and the hydraulic fluid is sufficient for the clamping power required, which can be read off an indicator.

There are also types in which the hydrostatic pressure required for extending the main piston is applied by pressure pins, rings, or a grease gun.

The drawback of the heretofore known clamps is that the piston does not return automatically to its initial position when the pressure is released, for example during dismantling of the clamp. After every clamping process, the piston must be pressed back into the clamp unit. In practice, this is often achieved by screwing the clamp further onto the shaft, after the hydrostatic pressure has been released, until the piston has returned to its initial position In order to do this, sometimes more power is required than that normally available by hand, so that this work could only be carried out with other tools, such as key wrenches or hook spanners. This is time-consuming on the one hand, and on the other hand there is a risk of damaging the clamp.

An object of the present invention is to provide a clamp such that the piston is reset automatically when the hydrostatic pressure within the clamp is released.

BRIEF DESCRIPTION OF THE DRAWINGS

This object, and other objects and advantages of the present invention, will appear more clearly from the following specification in conjunction with the accompanying drawings, in which:

FIG. 13 is a simplified partially sectioned side view of a different inventive design of a clamp; and FIG. 14 is a simplified partially sectioned side view of a further design of an inventive clamp.

SUMMARY OF THE INVENTION

Figure 1:
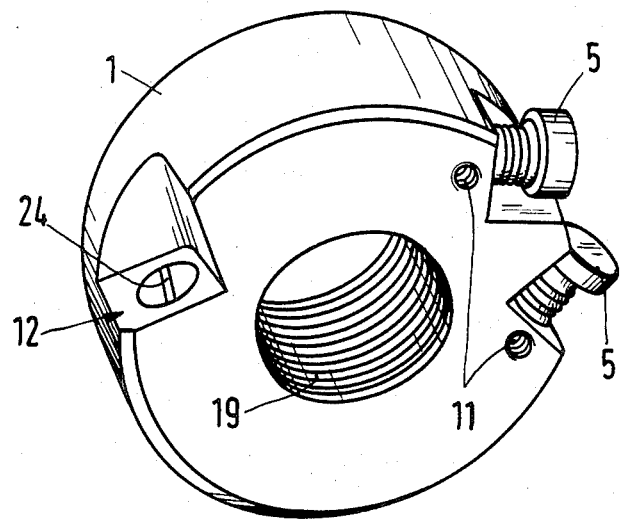
FIG. 1 is a schematic perspective view of a clamp of an existing type.
Figure 2:
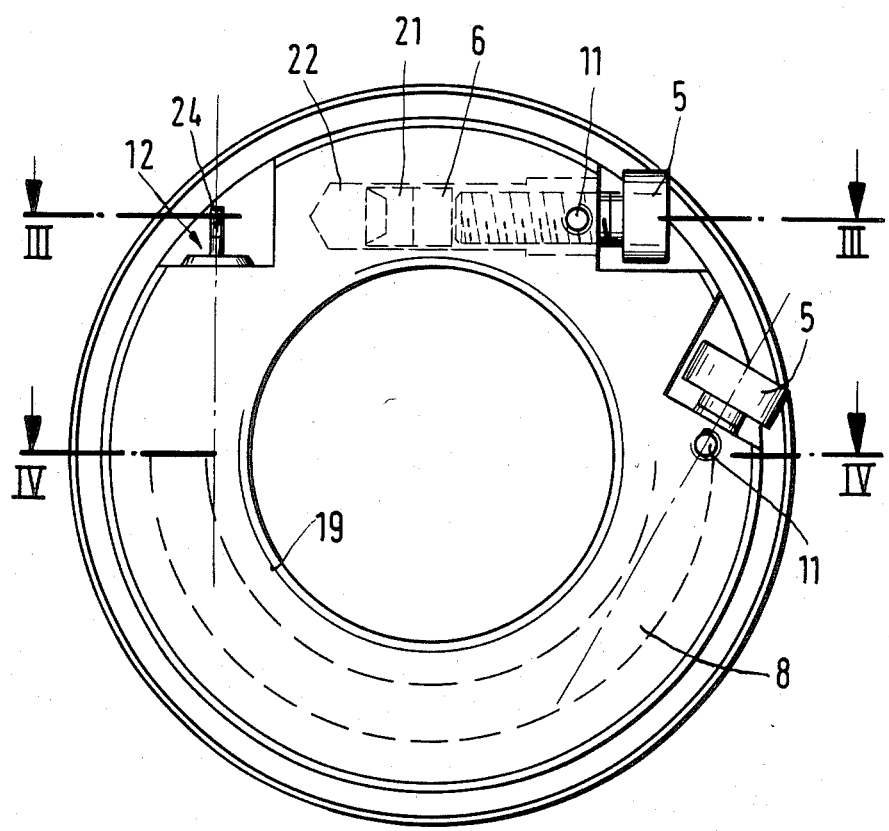
FIG. 2 is an end view of one exemplary embodiment of a clamp of the present invention.

The clamp of the present invention is characterized primarily in that the piston is spring-loaded in the direction of release.

As a result of the spring-loading, the piston is under a constant return pressure which has to be exceeded when tightening the device by means of the hydraulic fluid. The piston is therefore automatically returned to its initial position as soon as the pressure is released.

In order to be able to apply the spring power required as to the piston while using a simple design and a flat construction, one of the preferred designs of the piston provides for a circular bead on its outer circumference. This bead is provided with a spring contact area which in turn is in contact with the radial inside edge of a cup spring.

If the clamp is intended for mounting on its outer circumference, and is therefore provided with an external thread, then pursuant to a preferred design, the piston is provided with a circular bead around its inside circumference. This bead also has a spring contact surface which in turn is in contact with the radial outside edge of a cup spring.

In accordance with the invention, several parallel acting helical springs could be used in place of a cup spring. This is of particular advantage in a clamp where the stroke of the piston is relatively long.

In a clamp of flat construction, a cup spring for generating the reset force is particularly advantageous since the stroke of the piston lies in the range of millimeters, and the cup springs are easy to secure from a technical point of view. In order not to affect the floating action of the piston, which also guarantees uniform distribution of the clamping power around the circumference even if the parts are not entirely plane parallel, the cup spring can also be provided with radial slots, as proposed by a further embodiment of the invention. The slots can be on the inner or outer edge of the cup spring, and are open. These slots produce spring tongues which, within a certain range, can travel different distances and therefore apply different levels of power. The cup spring can be matched to the task involved by changing the number and width of the slots. For example, the slots may be much narrower than the spring tongues they form, measured in the direction around the circumference of the cup springs. Alternatively, the slots may be at least approximately the same width as the spring tongues they form.

In order to secure the cup spring to the clamp, it is either of one-piece design with a retaining nut which is screwed onto the clamp, or it is secured on the outside of the clamp by means of a separate retaining nut. In clamps which are to be secured on their outer circumference, the cup spring is secured on the inside thread of the clamp. In so doing, the spring is secured in such a way that with the piston in its starting position, a certain tension is applied which is large enough to overcome the friction of the seals and the piston, and allows the piston to be reset into its starting position.

The advantages of the present invention lie primarily in the fact that the piston is automatically reset into its starting position during dismantling of the clamp, i.e. when releasing the pressure in the clamp, and in that in designs having adjustment pistons or pins, these are also reset automatically. This allows fast and simple dismantling of the clamp, and furthermore dispenses with the often time-consuming work of resetting the piston.

DESCRIPTION OF PREFERRED EMBODIMENTS

Referring now to the drawings in detail, FIG. 1 shows a greatly simplified perspective view of a chuck or clamp 1 according to the state of the art FIGS. 2 to 14 show exemplary embodiments according to the present invention.

The clamp 1 is provided with an inside or female thread 19 (FIG. 1) for screwing onto a shaft 2 of a cutting machine. The outside circumference of the clamp has a milled edge or even knurling 20, and is normally screwed onto the end 2' of the shaft by hand (FIG. 4) until its front face lies against a spacer ring 3. Screws 5 are then inserted into the clamp 1 (see also FIG. 3), whereby a circular or band piston 8 is pushed axially in the direction towards the spacer ring 3 to clamp the tool 4 against a back stop (not shown in FIG. 4) in the axial direction.

When the screw 5 is tightened, the adjustment piston 6 behind this screw is pressed into a hole 22. The hole is connected via a channel 7 to the pressure space 23 of the piston 8. The hole 22, the channel 7, and the space 23 are full of hydraulic fluid (shown by dots in the diagram), which is preferably grease, thus producing a hydrostatic transmission of power between the adjustment piston 6 and the main piston 8. The different size of the areas of the pistons 6 and 8 involved produces the power transmission necessary for applying the high axial clamping pressure. The ratio between the power to be applied to the screw 5 and the power produced by the piston 8 follows the physical rules, but friction and spring forces (explained below) are also to be overcome.

In order to prevent hydraulic fluid from leaking out of the clamp, there is a seal 21 between the adjustment piston 6 and the hydraulic fluid, and a seal 9 between the piston 8 and the hydraulic fluid. The screw 5—two screws are provided in the illustrated embodiment—is secured in a threaded insert 10 which can be fixed by a set screw 11.

In this embodiment, the clamp 1 is provided with a hydraulic power indicator 12 so that the clamping force can be read off outside the clamp. The power indicator 12 is provided with a pin 24 with markings which is moved outwardly against spring pressure by a piston below it (not shown) as soon as the piston, which, like the adjustment piston 6, is connected to the hydrostatic system (see FIG. 5), is pressurized. The power indicator 12 is normally calibrated, so that the power applied can be read off accurately.

Figure 3:
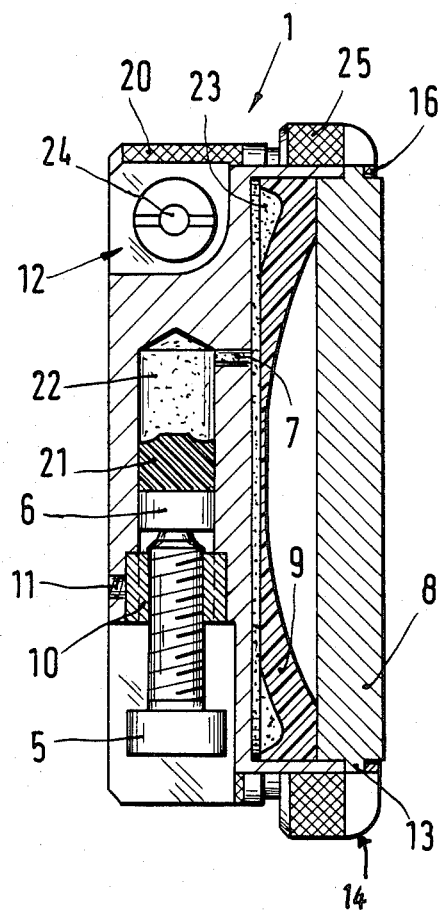
FIG. 3 is a view that shows a cross-section taken along the line III—III in FIG. 2.
Figure 4:
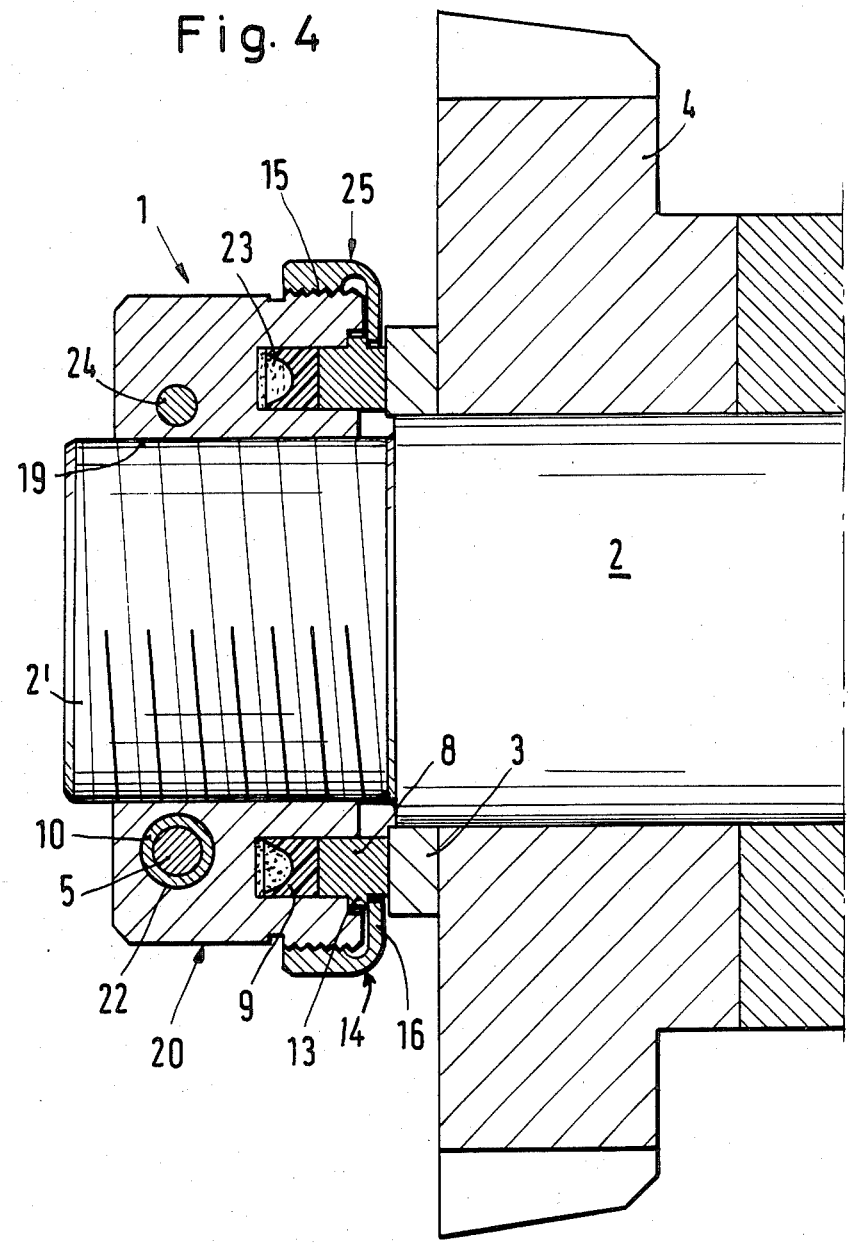
FIG. 4 is a view that shows a cross-section taken along the line IV—IV in FIG. 2, whereby the clamp is fitted on a shaft and secures a tool.
Figure 5:
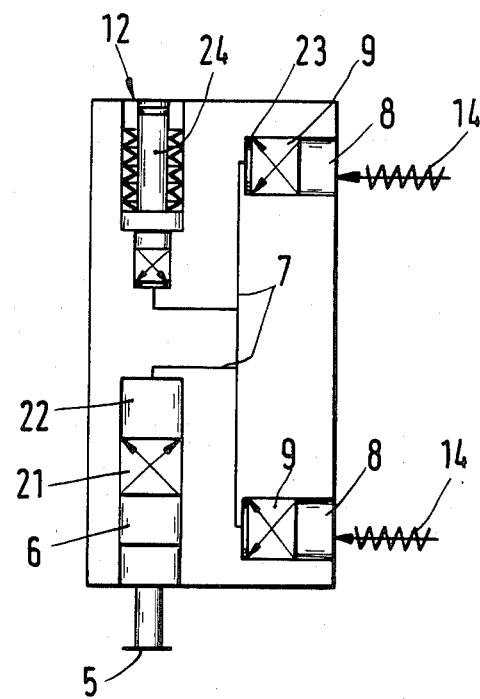
FIG. 5 is a schematic illustration of the clamp according to the invention.
Figure 6:
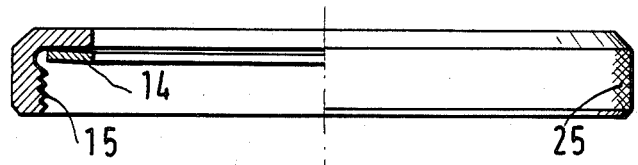
FIG. 6 is a partially sectioned side view of the retaining nut with a cup spring.
Figure 7:
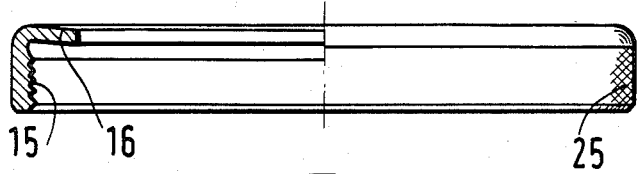
FIG. 7 is a partially sectioned side view showing an inventive embodiment in which the retaining nut and the cup spring are one piece.

The piston 8 is provided on its outer circumference with a bead 13 against which a cup spring 14 is applied. The cup spring shown in FIGS. 3 and 4 is designed as a retaining nut, and is secured to the outside of the clamp 1 via a thread 15. The outside of the cup spring 14, which is designed as a nut, is provided with a knurled area 25 and can be tightened by hand. In FIG. 7, the retaining nut is shown with the spring 14. In this embodiment, the threaded portion 15 and the spring portion 16 are one piece. A two-part design consisting of a cup spring 14 and a retaining nut 15 is also possible according to the invention, as shown in FIG. 6.

Figure 8:
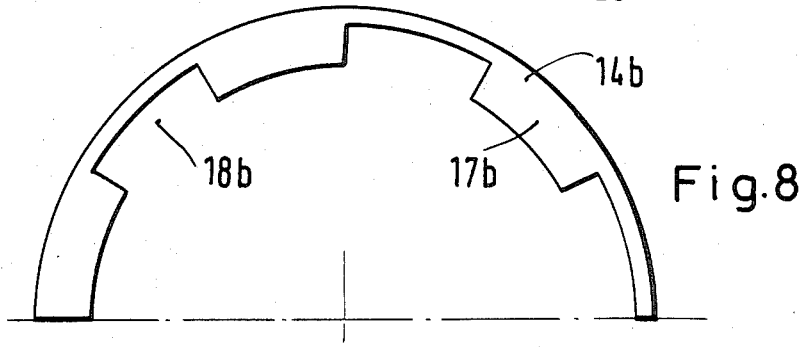
FIG. 8 is a plan view of a cup spring serving as a reset spring.
Figure 9:
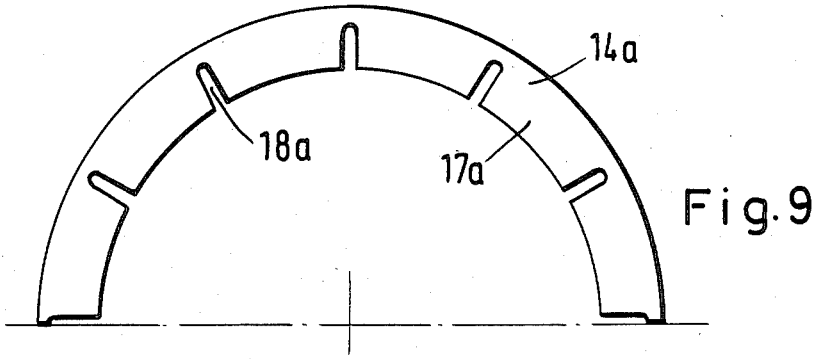
FIG. 9 is a plan view of a cup spring of a different design.
Figure 10:
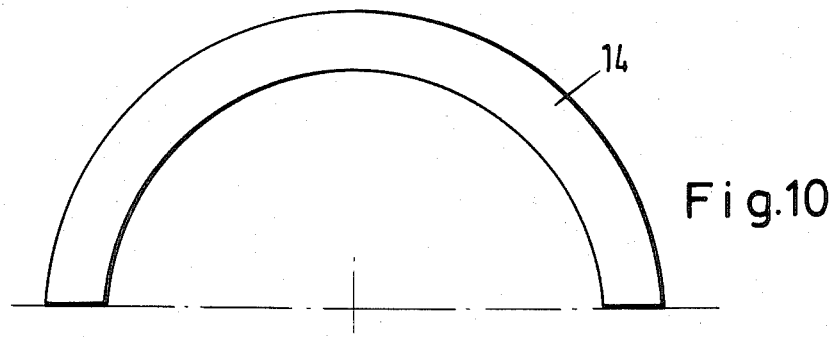
FIG. 10 is a plan view of a further design of the cup spring.

Three exemplary embodiments of cup springs are shown in FIGS. 8 to 10, whereby the design of the cup spring/nut does not depend upon whether it is a single part and as a nut, or two part as a nut 15 and a spring 14. As shown in FIGS. 8 and 9, the cup springs can have slots 18a, 18b which produce individual spring tongues 17a, 17b. On the one hand, the number and width of the slots 18a and 18b affects the stiffness of the spring (the spring stiffness falls as the number and width of the slots 18a, 18b increases), and on the other hand the division into individual spring tongues 17a, 17b provides an approximately uniform distribution of the pressure on the piston 8. This is particularly important if the items to be clamped are not completely plane parallel and the piston 8 protrudes at an angle out of the clamp 1, in which case with a solid cup spring 14 (FIG. 10) almost the entire spring pressure would be applied at the point where the piston is extended the furthest. This is undesirable since the pressure applied by the piston 8 to the tool 4 or workpiece could then not be uniform.

When the adjustment screw is loosened, the cup spring 14, which is prestressed when the screw 5 is tightened, and presses on the bead 13 of the piston 8, presses the piston 8, the seals 9 and 21, and the adjustment piston 6, which are connected by the hydraulic medium, back into their starting position. This guarantees a simple and fast release of the clamp, and also dispenses with the manual resetting of the piston 8 which with the heretofore known devices was often forgotten and therefore involved additional work when the next clamping process was to take place.

Figure 11:
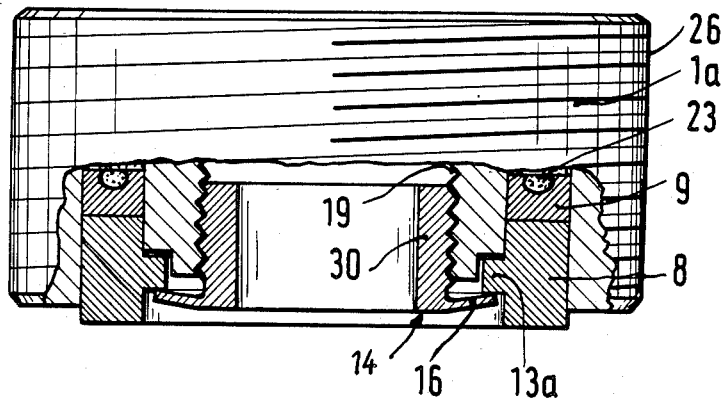
FIG. 11 is a simplified partially sectioned side view of a further inventive embodiment of a clamp.

FIG. 11 shows a clamp 1a which is provided with an external or male thread 26, and which is intended to be screwed into a hollow cylinder or shaft. In this embodiment, the piston 8 is provided with a circular bead 13a on its inside circumference. A cup spring 14 having a sleeve 30 is supported against the bead 13a. The sleeve 30 has an external thread for fitting into the inside thread 19 of the clamp 1a. The cup spring 14, with its sleeve 30, is screwed into the clamp 1a to such an extent that the cup spring 14 exerts a certain force against the piston 8 in order to reset the piston into its initial position when the pressure is released.

Figure 12:
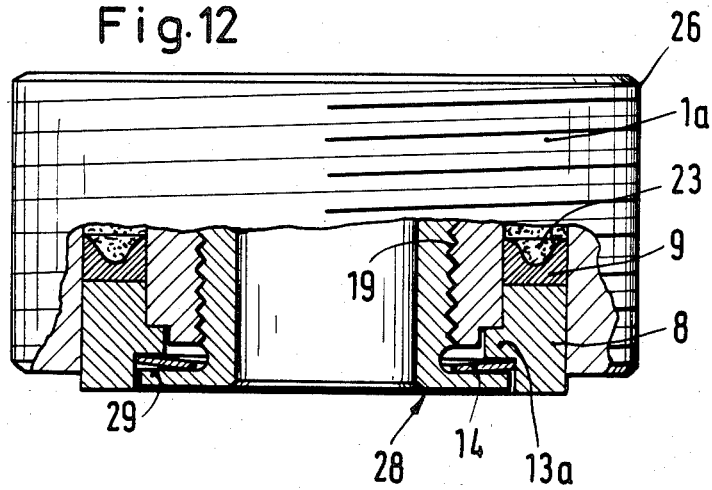
FIG. 12 is a view showing features according to FIG. 11, whereby the screw and cup spring are separate parts.

According to a further design of the invention, the cup spring 14 on the inner circumference of the piston 8 can also be secured by a screw 28 in the inside thread 19 of the device 1a, whereby the cup spring 14 is located between the circular bead 13a of the piston 8 and the top support area 29 of the screw 28, as shown in FIG. 12 with a cup or plate spring 14, and in FIG. 13 with helical springs 14c. Although the cup spring 14 shown in FIG. 12 differs in its dimensions from the cup springs in the previous embodiment, in principle the same springs as shown in FIGS. 8, 9 and 10 are used, whereby their effect is as stated above. When using slotted cup springs, the slots are preferably open towards the circumference which lies in contact with the piston 8.

FIG. 13 shows a further design of a clamp 1b similar to FIGS. 11 and 12, whereby the piston reset power is applied by helical springs 14c acting in parallel and located in a circle (indicated along the dot-dash line). The helical springs 14c are located uniformly distributed around the circumference between a wide bead 13c of the piston 8 and a wide top support surface 29 of the securing screw 28 (see FIGS. 13 and 14). This securing screw 28 may have a hollow-cylindrical shaft 28a. The top support surface 29 of the screw 28, and the spring contact area on the bead 13a, are particularly wide in order to safely secure the springs 14c. The use of helical springs 14c is particularly advantageous where the piston 8 makes a relatively long stroke. The reset force with which the piston 8 is pressed back into the housing of the clamp 1 when the hydraulic pressure is released can be influenced by the number, gauge and number of windings, and the material of the springs. In clamps intended to be screwed onto a shaft, the helical springs 14c are secured between a wide bead 13 on the outer circumference of the piston 8 and a retaining nut, as shown for example in FIG. 14. A secure fit and uniform distribution of the springs are thus provided.

FIGS. 1 to 4 show embodiments in which the clamping pressure required is generated by tangential adjustment pistons 6. Neither the layout of the pistons nor the pressure generation as such is decisive for the automatic piston reset facility of the present invention. The former, for example, also can be provided by thrust pins, rings, a grease gun, or the like. When selecting the size of the springs 14, 14a, 14b, 14c, however, the friction from the seals, the adjustment pistons, the pins, etc., which is also to be overcome by the hydraulic fluid, must be taken into consideration. When using helical springs, it is important that these are distributed uniformly around the bead and are secured so that they cannot slip.

The automatic piston reset facility by spring-loading is a simple method of safely resetting the piston into its initial position as soon as the hydraulic pressure in the device has been released, thus making it easy to dismantle the clamp. This dispenses with the time-consuming resetting of the piston "by hand", and the clamp is therefore available for use again immediately.

The present invention is, of course, in no way restricted to the specific disclosure of the specification and drawings, but also encompasses any modifications within the scope of the appended claims.

What I claim is:

1. A pressurized clamp having a longitudinal axis for securing tools or workpieces; said clamp having a front end and having a floating circular piston which is mounted at the front end for exerting pressure against said tool or workpiece to effect the securing thereof; said floating circular piston being adjustable axially toward said tool or workpiece by means of a pressurized fluid; the improvement in combination therewith which comprises:
   circular spring means for adjustably spring-loading said floating circular psiton biased symmetrically relative to the longitudinal axis of the clamp in a direction away from said tool or workpeice for automatically and uniformly moving said floating circular piston away from said tool or workpiece when hydrostactic pressure exerted by said pressurized fluid is released to effect return of said floating circular piston so that complicated and bothersome manipulations as to the return of said floating circular piston are avoided;
   said piston being provided with contact means for said circular spring means; and
   said circular spring means comprises at least one reset spring which acts against said contact means of said piston to spring-load the latter in the direction away from said tool or workpiece;
   said contact means being an annular bead which is formed on the outer periphery of said piston and provides a radial contact surface for said at least one reset spring.

2. A clamp in combination according to claim 1, in which said reset spring is a cup spring, the radially inner portion of which acts aganist said bead of said piston.

3. A clamp in conbination according to claim 2, in which said cup spring is embodied on one piece as a retaining nut which is screwed onot said clamp.

4. A pressure-medium-actuated clamping device having a longitudinal axis and provided for axially securing tools or workpieces arranged upon a shaft, said clamping device including a clamping body having a front end and a threaded portion as well as also including therewith a floating circular piston mounted at the front end for exerting pressure against said tool or workpiece to effect axial adjustment via a pressure medium, comprising in combination therewith:
   a circular bead segment provided on said floating circular piston and having a radial cross section projecting symmetrically to the longitudinal axis of the clamping device, said circular bead segment having a radial circular engagement surface;
   a circular spring means projecting radially as to said circular engagement surface and engaging against said circular engagement surface counter to the pressure medium; and
   a retaining nut held under spring tension in engagement symmetrically relative to the longitudinal axis of the clamping device aganist said radial circular engagement surface of said floating circular piston, said retaining nut being adjustable in axial direction upon the clamping body with the threaded portion, said circular spring means being secured in such a way that with said floating circular piston in a starting position thereof there is applied a certain tension which is large enough to overcome friction of seals and the piston and which allows said floating circular piston to be reset into starting position thereof.

5. A clamping device in combination according to claim 4 in which said retaining nut and said spring means form a single unitary part.

6. A clamping device in combination according to claim 5 in which said spring means is a cup spring and said circular bead segment is arranged along an outer periphery of said floating circular piston.

* * * * *